United States Patent [19]

Lam et al.

[11] Patent Number: 4,576,577
[45] Date of Patent: Mar. 18, 1986

[54] BLENDED MODE CONCEPT FOR CONTROL OF FLIGHT SIMULATOR MOTION SYSTEMS

[75] Inventors: Wim J. Lam, Apalachin, N.Y.; Luitzen Devries, Amstelveen, Netherlands; Gordon M. McKinnon, Montreal; Jean J. Baribeau, St. Laurent, both of Canada

[73] Assignee: CAE Electronics, Ltd., Montreal, Canada

[21] Appl. No.: 488,426

[22] Filed: Apr. 25, 1983

Related U.S. Application Data

[63] Continuation-in-part of Ser. No. 217,701, Dec. 18, 1980, abandoned.

[51] Int. Cl.⁴ .............................................. G09B 9/08
[52] U.S. Cl. ..................................................... 434/58
[58] Field of Search ...................... 434/55, 56, 57, 58, 434/59, 46, 49

[56] References Cited

U.S. PATENT DOCUMENTS

| | | | |
|---|---|---|---|
| 2,687,580 | 8/1954 | Dehmel | 434/55 |
| 2,930,144 | 3/1960 | Fogarty | 434/58 |
| 3,304,628 | 2/1967 | Kaplan | 434/58 |
| 3,538,624 | 11/1970 | Minnich et al. | 434/46 |
| 3,890,722 | 6/1975 | Nunez | 434/55 |

Primary Examiner—William H. Grieb
Attorney, Agent, or Firm—Fishman & Dionne

[57] ABSTRACT

The invention relates to a motion simulator system, for example, a flight simulator system. In accordance with the invention, the system is driven by command signals representing both position and acceleration, and a circuit is provided to process and combine the signals to provide a system command signal. High frequency position command signals, and low frequency acceleration command signals, are eliminated by their drive circuits, and all command signals are varying electrical voltages.

8 Claims, 2 Drawing Figures

BLENDED MODE CONCEPT FOR CONTROL OF FLIGHT SIMULATOR MOTION SYSTEMS

CROSS-REFERENCE TO RELATED APPLICATION

This is a continuation-in-part application of parent application Ser. No. 217,701, filed Dec. 18, 1980, now abandoned.

BACKGROUND OF THE INVENTION (a) Field of the Invention

The invention relates to a motion simulator system. More specifically, the invention relates to such a system which is driven by command signals representing both position and acceleration, which system includes means for combining the two command signals.

The invention also relates to circuit means for combining and processing the acceleration and position command signals and for providing a signal for driving the means for imparting motion.

(b) Statement of the Prior Art

In motion simulator systems, and especially in flight simulator motion systems, the sensation of motion is given by simulating forces acting on the users of the simulator to give the user the feeling of motion. Thus, the systems must take into account the type of motion which should be experienced by the user. That is, there will be different forces acting on the user when the aircraft is supposed to be banking than when the aircraft is supposed to be yawing.

Exemplary of the teachings in the art in this regard are U.S. Pat. No. 2,687,580, issued Aug. 31, 1954; U.S. Pat. No. 2,930,144, issued Mar. 29, 1960; U.S. Pat. No. 3,304,628, issued Feb. 21, 1967; U.S. Pat. No. 3,538,624, issued Nov. 10, 1970; and U.S. Pat. No. 3,890,722, issued June 24, 1975.

The '580 patent teaches a system for simulating forces acting on the user which forces are due to gravity and centrifugal forces when an aircraft is yawing and pitching. This is a relatively early proposal as it relates to development work done prior to May 25, 1948.

The '144 patent relates to a system for simulating the pressures and forces due to acceleration. The same comments may be made about the '628 patent.

The '624 patent uses filtered white noise signals, superimposed on signals of normal aircraft motion, to produce simulation of turbulence. The '722 patent teaches a system for simulating motion in different environments, that is, either of airborne aircraft, or of vehicles moving under water.

SUMMARY OF THE INVENTION

In the control of flight simulator motion systems, or other devices used to provide the sensation of motion, acceleration is the variable of prime interest since it is acceleration which is perceived as motion by human sensory systems. In conventional systems, position is used as the principal control valuable. The concept proposed in the present application is to mix position and acceleration control in such a way as to control acceleration in the high frequency range in which fidelity of motion is most important, and to control position at lower frequencies to keep the motion system centered within its motion.

The concept is implemented by eliminating high frequency position control signals, and by eliminating low frequency acceleration control signals. The resulting control signals are then mixed to provide a combined signal for driving the motion simulator.

The general purpose of this invention is to improve the performance of the motion system by increasing the bandwidth of its frequency response. To attain this, the computing device is used to generate electrical signals representative of the desired position and acceleration of the extensible portion relative to the fixed portion of the extensible member. The signals are passed through electrical circuits such that the position signal is operative at low frequencies and the acceleration signal is operative at high frequencies. A further electrical circuit combines the resultant signals and adds electrical signals representing combinations of pressure in the hydraulic member, current position of the extensible portion, current velocity of the extensible portion and force applied by the hydraulic member. The resulting signal is used to control an electro hydraulic valve to regulate flow to the extensible number. The use of a combination of position and acceleration signals is of particular importance when applied to systems used to provide realistic simulated motion to an occupied cab such as the crew compartment of a flight simulator. In this case, the occupants are sensitive primarily to acceleration and changes in acceleration so that the improved fidelity attained by including high frequency control of acceleration enhances motion realism.

To be effective, the extensible members used must have low friction and the electrical devices used to control the extensible member must be capable of operating in the frequency ranges where acceleration is to be controlled. In a flight simulator, a typical actuator is a hydraulic cylinder fitted with hydrostatic bearings to support the extensible member in the fixed member such as to reduce friction forces, and a force transducer would be included to measure the force impacted to the crew compartment by each member. The force signal is one input to the electric circuit used to control movement of the extensible member and acts in such a way as to reduce unwanted accelerations and to compensate for the changes in force applied to each member due to changes in attitude of the crew compartment.

In accordance with a particular embodiment of the invention there is provided, for use in a motion simulator system which has a platform unit, means for imparting motion to said platform unit, and means for driving said means for imparting motion; a circuit for providing a command signal to said means for driving, said circuit comprising: means for receiving an acceleration command signal; means for receiving a position command signal; and means for combining the acceleration and position command signals to provide a signal for driving said means for imparting motion.

In accordance with a further embodiment of the invention there is provided a motion simulator system comprising: a platform unit; means for imparting motion to said platform unit; means for driving said means for imparting motion; and circuit means for providing a command signal to said means for driving; said circuit means comprising means for receiving an acceleration command signal; means for receiving a position command signal; and means for combining the acceleration and position command signals to provide a signal for driving said means for imparting motion.

In accordance with a still further embodiment of the invention there is provided a motion simulator system comprising: a platform unit; a plurality of extensible members disposed below said platform unit for supporting said platform unit at respective points thereof and for imparting motion to said platform unit; each said extensible member including servo means for imparting motion to an extensible portion of said extensible member, and circuit means for providing a command signal to said servo means; said circuit means comprising: means for receiving an acceleration command signal; means for receiving a position command signal; and means for combining the acceleration and position command signals to provide a signal for driving said means for imparting motion.

BRIEF DESCRIPTION OF DRAWINGS

The invention will be better understood by an examination of the following description together with the accompanying drawings, in which.

DETAILED DESCRIPTION OF DRAWINGS

Some prior art motion simulators utilize a number of hydraulically actuated, extensible members, connected between a fixed base and the platform to be moved in a controlled way. The hydraulic actuators are controlled by means of computing devices which generate electrical signals representative of the desired position of the extensible member. The resulting electrical signal is fed into electrical devices, in some cases, modified by the addition of electrical signals representing combinations of pressure in the hydraulic member, current position of extensible portion, current velocity of the extensible portion or force applied by the extensible member.

Figure 1:
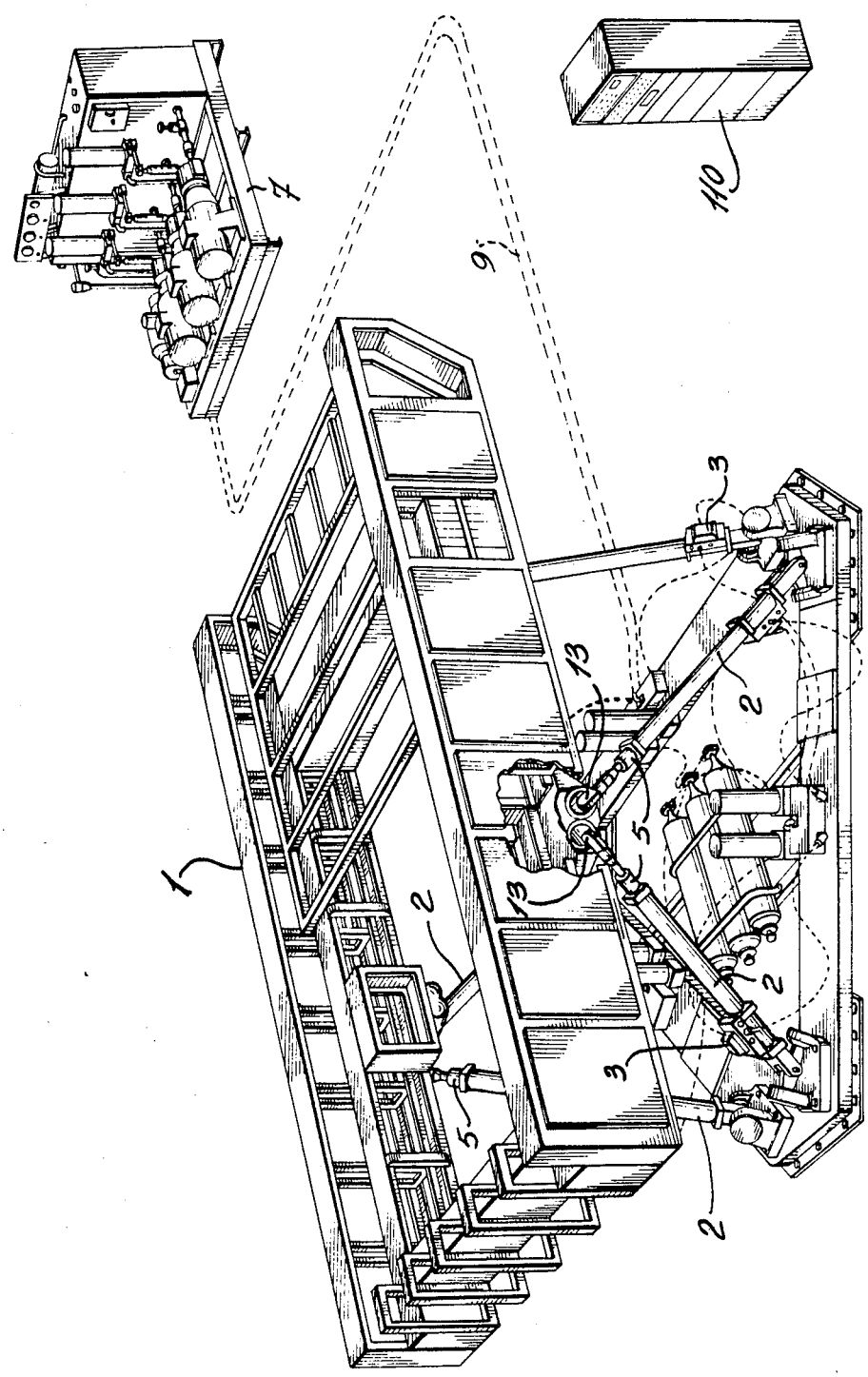
FIG. 1 illustrates a typical motion simulator system.

FIG. 1 illustrates a typical member of a motion system of the above-described type. In FIG. 1, 1 is a platform which carries the cabin in which the user is disposed during use of the system. The platform is supported on extensible members 2. Usually, these extensible members are hydraulically actuated. FIG. 1 illustrates a system in which six such extensible members support the platform. This is a typical configuration, but some motion systems may have more or less extensible members.

Each extensible member is controlled by a servo-valve 3 and includes an extensible portion 5 which is at the end of the extensible member closest to the platform.

Hydraulic fluid for driving the extensible member is provided from the hydraulic power supply 7 through flexible hoses 9.

The electrical signals used to control the motion of the extensible members come from the control cabinet 11 which contains electronic circuits which respond to command inputs from a computer (not shown), and combine the command signal with electrical signals reflecting position, force and velocity. The force signal in the system shown in FIG. 2 hereof is derived from a force transducer 13 located at the connection point of each extensible member and the platform.

The motion system illustrated in FIG. 1 is capable of motion in six degrees of freedom. However, as will be appreciated, the invention described below applies equally as well to motion systems constrained to fewer degrees of freedom, and is independent of the geometry or location of the extensible members.

In accordance with the present invention, a drive circuit for controlling the motion of the extensible members receives as inputs both acceleration command signals and position command signals. An embodiment of such a circuit is illustrated in FIG. 2.

Figure 2:
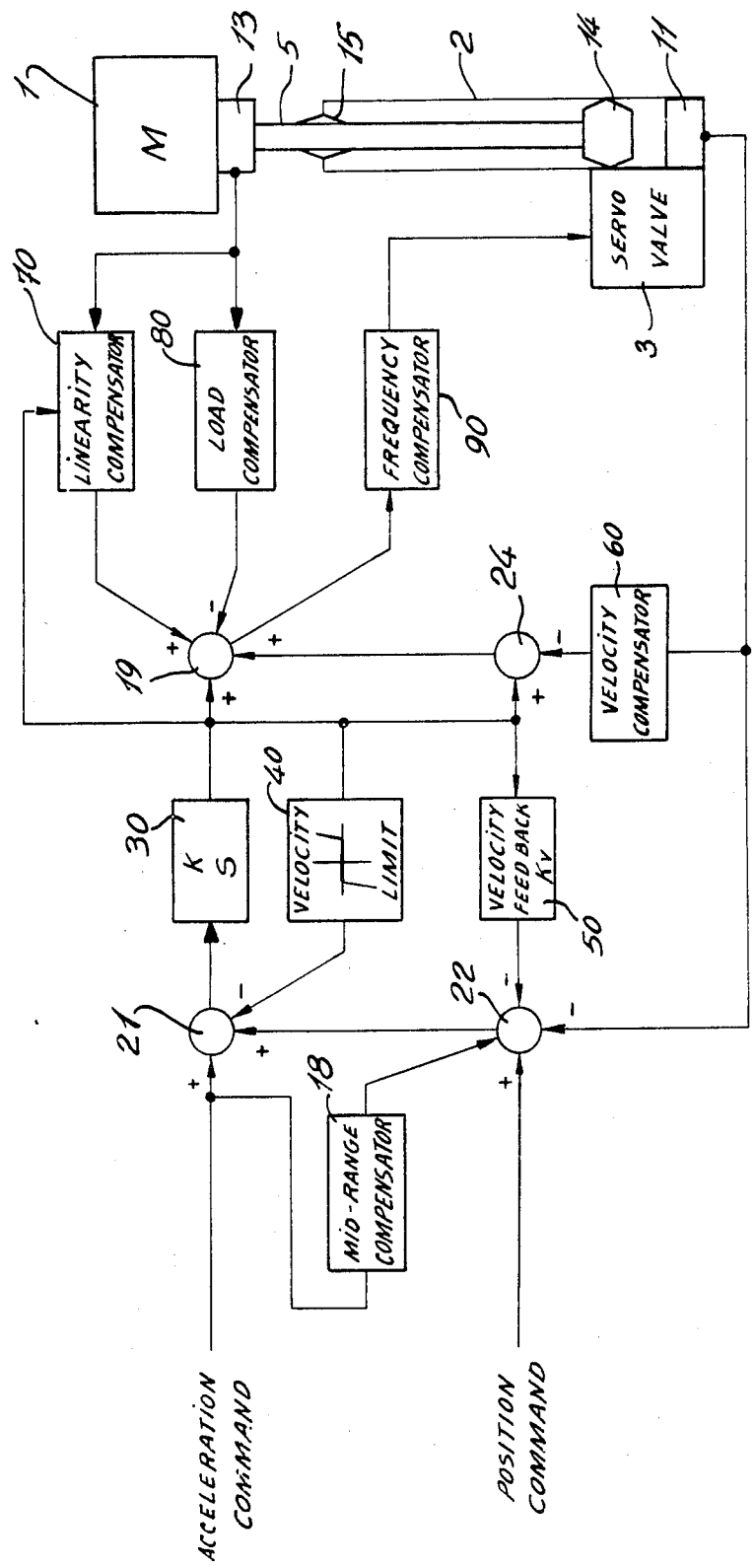
FIG. 2 illustrates an embodiment of a motion drive circuit in accordance with the invention.

Referring now to FIG. 2, the acceleration command signal is applied to summing junction 21 while the position command signal is applied to summing junction 22.

Both the command signals are varying signals and a change in the level of either signal represents, respectively, a change in acceleration and a change in position. As humans are not too sensitive to slow changes in acceleration, these slow changes in acceleration are eliminated by the drive circuit. The use of quickly changing acceleration signals improves fidelity and enhances motion realism. Quickly changing position command signals are eliminated by their drive circuits.

The use of a position command signal is applied through summing junction 22 to keep the motion system centered within its motion envelope by eliminating command signals for large changes in position.

As will be seen below, the acceleration and position command signals are combined to provide a drive signal.

As will be appreciated, there is a frequency overlap between acceleration and position commands, and in the overlapping frequencies, the signals will cancel each other. A mid-range frequency compensator 18 is provided for the purpose of compensating for this overlap in frequency and for removing this defect.

It is also necessary to modify the control signal with signals representative of the position, velocity, force and mass distribution of the extensible member. For this purpose, the circuit includes blocks 30, 40, 50, 60, 70 and 80. As will be appreciated, many variations of this circuit can be visualized and designed. The circuit in FIG. 2 represents only a particular and operating embodiment.

Considering the blocks in the figure, block 30 represents an electronic integrator used to convert the acceleration command to a velocity signal. Block 40 is a limit circuit and imposes limits on the maximum velocities which can be commanded. Block 50 is a velocity feedback circuit, and block 60 is a velocity compensator circuit whose function will be explained below.

The extensible portion 5 of extensible member 2 is supported in the cylinder by low friction bearings 15 and includes transducers 11 and 13 at the bottom and top ends thereof respectively. The transducer 13 is a force transducer and provides an electrical signal related to force, and the transducer 11 provides electrical signals reflecting position and velocity of the extensible portion 5 or the piston and cylinder arrangement which comprises the extensible member 2.

In operation, the circuit operates as follows:

An acceleration command signal is applied to summing junction 21. At the same time, the acceleration command is applied to a mid-range compensator 18 whose output is, in turn, supplied to the summing junction 22.

A position command signal is applied to the summing junction 22, and the output of the summing junction 22 is also applied to summing junction 21.

The output of summing junction 21 is fed to the integrating circuit 30 to provide a velocity signal, and the output of the integrating circuit is fed to the velocity limiting circuit 40 which is returned to the summing junction 21.

The output of the integrator is also fed to summing junction 19 where it is modified by electrical signals which compensate for the dynamics and non-linearities in the mechanical components. These signals are derived from circuits 70, 80 and 90. 70 compensates for the non-linearity characteristics of the mechanical components, and 80 compensates for the load characteristics thereof, while block 90 compensates for the valve frequency response.

The output of 19 is then fed, through 90, to the servo-valve 3 which controls the flow of hydraulic fluid into an out of the extensible member 2 which, in the present embodiment, comprises a hydraulic cylinder, such as to cause the extensible member, in this case the piston 5, to extend or retract as required.

The position of the piston 5 is sensed by the transducer 11 which provides an electrical signal to summing junction 22 and, in addition, provides a compensation signal through block 60 to the summing junction 24 and, subsequently, to the summing junction 19. Summing junction 24 also receives an input from the integrator 30.

Motions of the piston resulting from signals to the servo-valve result in force variations applied to the simulated crew compartment represented by block 1 as a fixed mass. The force transducer 13 detects these changes and provides a signal to compensate for them.

The illustrated circuit constitutes but a single embodiment for implementing the invention. The basic point of the invention is that acceleration command and position command signals are combined and suitably processed and modified to provide a drive signal to motion imparting means for providing simulated motion to the platform which carries the simulated crew compartment. In accordance with the invention, low frequency components of the acceleration signal and the high frequency components of the position command signal are filtered out before these signals are combined and modified and processed in a circuit.

As will be appreciated, a separate such circuit is provided for each of the extensible members, and each of the extensible members is driven by its respective servo-valve which is, in turn, controlled by the circuit.

Although a single embodiment has been described, this was for the purpose of illustrating, but not limiting, the invention. Various modifications which will come readily to the mind of one skilled in the art are within the scope of the invention as defined in the appended claims.

We claim:

1. A motion simulator system comprising:
   a platform unit;
   means for imparting motion to said platform unit;
   means for driving said means for imparting motion; and
   circuit means for providing a command signal to said means for driving;
   said circuit means comprising:
   means for receiving an acceleration command signal;
   means for receiving a position command signal; and
   means for combining the acceleration and position command signals to provide a signal for driving said means for imparting motion; and
   wherein said command signals comprise varying signals, and further comprising:
   means for eliminating the effects of slowly varying acceleration command signals;
   means for eliminating quickly varying position command signals; and
   means for processing and combining the uneliminated acceleration command signals and position command signals; and
   wherein:
   the low cut-off frequency of said acceleration command signal is less than the high cut-off frequency of said position command signal; and
   compensation means for removing distortions in the range between said high cut-off frequency and said low cut-off frequency.

2. A system as defined in claim 1 wherein said means for imparting motion comprises a piston and cylinder arrangement;
   the piston of said piston and cylinder arrangement being connected to said platform;
   said means for driving the means for imparting motion comprising a servo-valve.

3. A system as defined in claim 2 comprising a plurality of piston and cylinder arrangements;
   said piston and cylinder arrangements being hydraulically driven.

4. A motion simulator system comprising:
   a platform unit;
   a plurality of extensible members disposed below said platform unit for supporting said platform unit at respective points thereof and for imparting motion to said platform unit;
   each said extensible member including servo means for imparting motion to an extensible portion of said extensible member, and circuit means for providing a command signal to said servo means;
   said circuit means comprising:
   means for receiving an acceleration command signal;
   means for receiving a position command signal; and
   means for combining the acceleration and position command signals to provide a signal for driving said means for imparting motion; and
   wherein said command signals comprise varying DC signals, and further comprising:
   means for eliminating slowly varying acceleration command signals;
   means for eliminating quickly varying position command signals; and
   means for processing and combining the uneliminated acceleration command signals and position command signals; and
   wherein:
   the low cut-off frequency of said acceleration command signal is less than the high cut-off frequency of said position command signal; and
   compensation means for removing distortions in the range between said low cut-off frequency and said high cut-off frequency.

5. A system as defined in claim 4 wherein each said extensible member comprises a piston and cylinder arrangement;
   said servo means comprising a servo-valve;
   a position and velocity transducer disposed at the bottom end of the cylinder of said piston and cylinder arrangements; and
   a force transducer disposed at the top end of said cylinder.

6. For use in a motion simulator system which has a platform unit, means for imparting motion to said platform unit, and means for driving said means for imparting motion;

a circuit for providing a command signal to said means for driving, said circuit comprising:

means for receiving an acceleration command signal;

means for receiving a position command signal; and means for combining the acceleration and position command signals to provide a signal for driving said means for imparting motion; and wherein said command signals comprise varying DC signals, and further comprising:

means for eliminating slowly varying acceleration command signals;

means for eliminating quickly varying position command signals; and means for processing and combining the uneliminated acceleration command signals and position command signals; and wherein:

the low cut-off frequency of said acceleration command signal is less than the high cut-off frequency of said position command signal; and compensation means for removing distortions in the range between said high cut-off frequency and said low cut-off frequency.

7. A circuit as defined in claim 6 and further comprising:

a first summing junction;

a second summing junction;

integrator means;

velocity limiter means; and velocity feedback means;

said acceleration command signal being fed to said first summing junction and said compensation means;

the output of said compensation means and said position command signal being fed to said second summing junction;

the output of said second summing junction being fed to said first summing junction;

the output of said first junction being fed to said integrator means;

the output of said integrator means being fed to said velocity limiter means and said velocity feedback means;

the output of said velocity limiter means being fed to said first summing junction; and the output of said velocity feedback means being fed to said second summing junction.

8. A circuit as defined in claim 7 wherein said means for imparting motion comprises a piston and cylinder arrangement having a force transducer at the free end of the piston and a velocity and position transducer at the bottom end of the cylinder, and wherein said means for driving comprises a servo-valve;

the circuit further comprising:

velocity compensator means;

linearity compensator means and a load compensator means for compensating for non-linearities and dynamics;

a frequency compensator;

a third summing junction; and a fourth summing junction;

the output of said first summing junction being fed to said third summing junction and to said linearity compensator means;

the output of said force transducer being fed to said linearity compensator means and to said first load compensator means;

the output of said velocity and position transducer being fed to said velocity compensator means;

the output of said velocity compensator means being fed to said fourth summing junction;

the output of said fourth summing junction being fed to said third summing junction;

the output of said third summing junction being fed to said frequency compensator means; and the output of said frequency compensator means being fed to said servo-valve;

whereby the output of said frequency compensator means comprises said command signal to said means for driving.

* * * * *